Sept. 6, 1966        R. MOORMAN        3,271,222
METHOD FOR PREPARING CORED LAMINATES
Filed Sept. 20, 1962
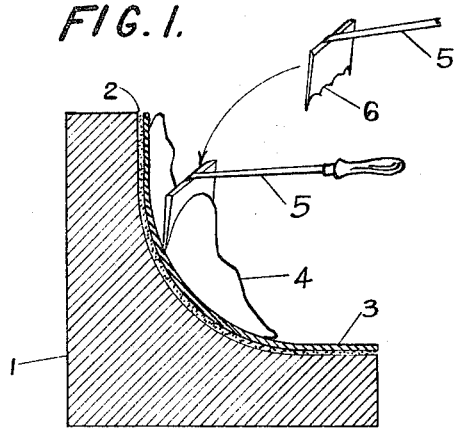
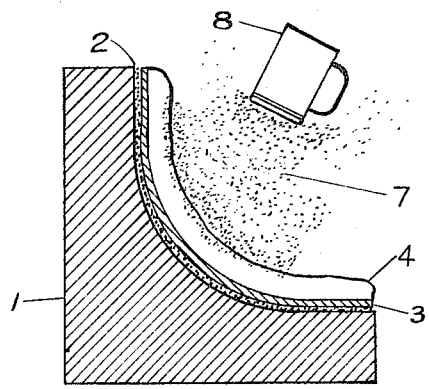
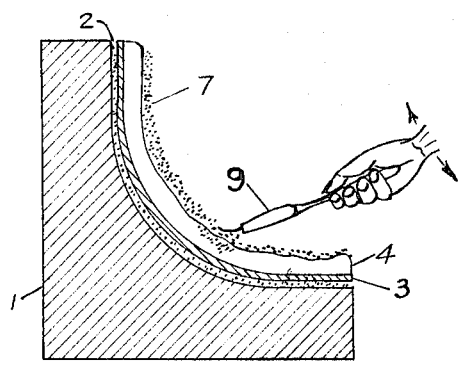
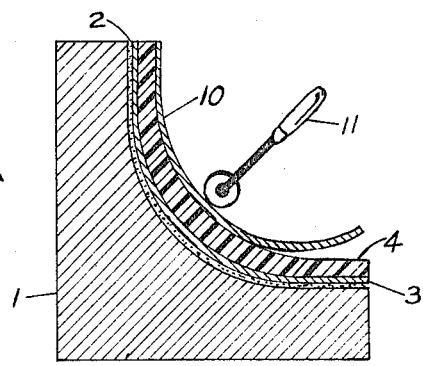
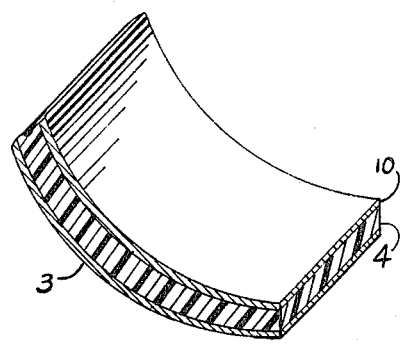
INVENTOR
Roger Moorman United States Patent Office 3,271,222
Patented Sept. 6, 1966

3,271,222
METHOD FOR PREPARING CORED LAMINATES
Roger Moorman, Gloucester, Va., assignor to Mobjack Manufacturing Company, Incorporated, Gloucester County, Va., a corporation of Virginia
Filed Sept. 20, 1962, Ser. No. 224,995
8 Claims. (Cl. 156—214)

This invention relates to a method for preparing laminated structures comprising low cost core materials, and more particularly to a method for preparing a cored laminate of high flexural strength and low cost in conformity with the contours of various surfaces including surfaces of compound curvature.

The greatest disadvantage of modern reinforced plastics is their flexibility and the way weight and cost multiply when structural stiffness is a requirement.

Heretofore, cored laminates in which high flexural strength and low density have been essential or desirable features, have been made by methods involving the painstaking preparation of cores in complex shapes by carving, cutting, or premolding and the later fitting of such shaped cores between protective laminae, whenever the finished product or laminated structure was in a form comprising complex curved surfaces.

Present day use of stiff, structural cores in products or structures of complex curvature is virtually non-existent due mainly to the high labor cost associated with the carving, cutting, bending, or premolding of the stiff core material necessary to make it conform to the complex shapes of many products and structures. Stiff cores which contribute structural strength to finished products or structures are not in common use due almost entirely to this cost factor even though their advantages would be highly desirable in many industries.

Accordingly, it is an object of this invention to improve upon existing methods for preparing cored laminates of high flexural strength in complex shapes by providing a method for preparing a cored laminate comprising a low density stiff core prepared in situ in conformity with the contours of the mold in which the laminate is made.

Another object of this invention is to reduce the cost and increase the stiffness of low density cored laminates of all shapes, including many heretofore impractical under existing methods of production, by providing a new concept in core materials and a new method for handling them which makes their use practical and economical.

At the heart of my invention is my discovery of a new method for preparing a low density core material which can be employed with conventional fabrics and impregnating resins, economically to produce high strength cored laminates in a wide variety of shapes.

Briefly, my method comprises the steps of preparing a lamina in contact with the contours of a previously prepared mold surface, applying a mixture comprising a hardenable resin and microparticulate aggregate dispersed therein in the form of a layer upon the surface of said lamina, applying additional dry microparticulate aggregate to the surface of said mixture, allowing said resin to migrate into said additional aggregate and to consolidate same with said mixture, hardening said mixture, thereby forming a stiff core and preparing a second lamina in contact with said core, thereby economically producing an extremely stiff, cored laminate or sandwich. Any suitable resin may be used, including polyester, epoxy, phenolic and other resins used in the laminating industry. Any suitable fabric may be employed with my method, glass fabrics being preferred.

The term "microparticulate aggregate" as used in this specification refers to any finely divided non absorbent cellular substance which may be compatible with the hardenable resin and associated catalyst or hardening agent. I prefer to use phenolic microballoons of particles size in the range 5 to 20 microns diameter as the microparticulate aggregate when the resin used is of the polyester type. Such microballoons are compatible with almost any type of hardenable resin or binder. For good results, the maximum diameter of a particle of the microparticulate aggregate employed should not exceed 500 microns.

In the drawing,

FIGURES 1–4 are transverse sections through a suitable mold illustrating the application thereto of the laminae and the core material employed in carrying out the method of this invention.

FIGURE 5 is a perspective view of a cored laminate prepared in accordance with the method of this invention.

Referring to FIGURE 1, numeral 1 designates a mold for forming a curved portion of laminate. Numeral 2 designates the conventional parting agent as well as the gel or finish coat which are used to prepare the mold to receive the first lamina. Said lamina 3 is shown as being in place in conformity with the contour of the mold. The conventional procedure usually comprises the steps of placing a sheet of fabric in contact with the previously prepared mold surface, and impregnating said sheet with a hardenable resin. A mixture comprising a hardenable resin and a quantity of microparticulate aggregate dispersed therein is designated by numeral 4 and is shown as being spread over the surface of lamina 3 by serrated trowel 5 which, for convenience, employs serrations 6 to form grooves in the surface of mixture 4 thus increasing its absorptive surface area. Also for convenience, the edges (not designated by numeral) of trowel 5 may be extended, thus fixing the thickness of the trowelled layer of mixture 4 when the tips of said edges are in contact with the surface of lamina 3. Many means for spreading a layer of mixture 4 of controllable thickness may be used and it should be understood that no limitation of the invention is intended by the illustration of this particular means.

Referring to FIGURE 2, mixture 4 is shown as having been spread over the surface of lamina 3, and additional dry microparticulate aggregate 7 is shown being dusted upon the surface of mixture 4 by means of dusting canister 8. This application of additional microparticulate aggregate 7 may be accomplished by any suitable means and no limitation of the invention is intended by the illustration of this particular means.

Subsequent to the application of additional aggregate 7, a consolidating action takes place during which the resin component of mixture 4 migrates into said additional aggregate 7 while said aggregate appears to be drawn into the layer of mixture 4. Whatever the exact mechanism involved is, the observed result is a substantially thorough consolidation of additional aggregate 7 with the mixture 4. The end product of this action is a substantially homogeneous core material.

In order to produce a substantially homogeneous core material by the method described, the initial layer of mixture 4, before application of additional aggregate 7, should have an optimum thickness of about one eighth inch. Beyond this thickness the quality of the final core diminishes due to lack of homogeneity since the consolidation process appears to become increasingly inefficient for greater thicknesses of the initial layer of mixture 4.

It would not be feasible initially, before the spreading operation shown in FIGURE 1, to load mixture 4 with the total amount of microparticulate aggregate which it must contain in the finished core to arrive at the desirable final high proportion of aggregate to resin binder which allows the production at low cost of cored laminates of high flexural strength. This is why my discovery of the method of this invention for the first time permits the preparation in situ in conformity with the contours of a mold, of a low density core material having a high proportion of aggregate to resin binder and capable economically of imparting the great stiffness to finished laminates which has long been sought by the laminating industry.

Using the method of this invention, the core material resulting from the hardening or curing of mixture 4 may have a final density as low as approximately 25 pounds per cubic foot when the initial mixture 4 comprised a resilient polyester resin of density about 72 pounds per cubic foot and phenolic microballoons of density about 12 pounds per cubic foot as the microparticulate aggregate, and additional aggregate was added until no more of it could be consolidated with mixture 4. The achievement of final densities in the cured core material in the range 25 through 40 pounds per cubic foot is standard with the method of this invention, when the initial trowelling mixture 4 has a density as high as 55 pounds per cubic foot.

Referring to FIGURE 3, the additional dry microparticulate aggregate 7 has been dusted over the surface of mixture 4 and is shown here being impacted lightly by means of impacting tool 9, thus hastening the process of consolidation of this additional aggregate 7 with the underlying mixture 4. Impacting tool 9 is simply an example of any convenient implement such as a spatula with a flexible blade or, as in this example, a stock with a flexible rubber flap attached thereto. The light impacting accomplished by this means speeds up the migration of resin from the underlying mixture 4 into the additional dry aggregate 7. This impacting step should be employed in the method of this invention when processing time is of the essence and when the highest possible loading of microparticulate aggregate in the final core material is desired. Any means for lightly impacting the dry microparticulate aggregate on the surface of mixture 4 lies within the scope of this invention. During this impacting step, it may be desirable, when extremely high proportions of aggregate in the finished core material is desired, to dust the surface of mixture 4 a second or third time with additional dry microparticulate aggregate 7.

Since the preferred optimum thickness of a layer of mixture 4 is about one eighth inch when maximum homogeneity of the finished core material is desired, it may sometimes be desirable to repeat the steps of FIGURES 1, 2 and 3 several times in sequence thus enabling the building up of several superimposed layers of substantially homogeneous core material. I have found that for a finished laminate of satisfactory flexural strength, the core material should never be built up by such repeated sequential applications of layers of mixture 4 and additional dry aggregate 7 consolidated therewith to give a final hardened core of more than one half inch in thickness, before the preparation of a covering lamina of fabric impregnated by a hardenable resin. Subsequent to the preparation of a lamina covering the core material, the entire process may be repeated to build up another layer of core material thereon which, in turn, would be covered by another lamina of fabric impregnated with hardenable resin. In this manner, the method of this invention may be practiced repeatedly to produce cored laminates of great thickness and flexural strength comprising many layers of core material separated by fabric laminate impregnated with hardenable resins.

Referring to FIGURE 4, roller 11 is shown as a means for preparing a covering layer of resin-impregnated fabric in contact with the hardened layer of core material resulting from curing of mixture 4 after the loading of same with the desired amount of additional dry microparticulate aggregate. Any conventional method for preparing this covering lamina in contact with the core material may be employed within the scope of this invention. It is also within the scope of this invention to prepare covering lamina 10 in contact with the core material resulting from a mixture 4 either subsequent to the complete hardening of mixture 4 or before mixture 4 has been completely hardened or cured. The choice of either time for the preparation of lamina 10 lies within the scope of this invention because I have found that satisfactory finished cored laminates can be produced either way. The mixture 4, after addition of the desired amount of additional dry microparticulate aggregate, is sufficiently stiff as to permit the immediate preparation thereon of covering lamina 10 without substantial danger of distortion of the thickness of the layer of mixture 4. Naturally, in such a case, the resin employed in compounding mixture 4 must not be an air cure resin but must be one of the type which cures by virtue of a catalyst or curing agent incorporated therein.

Shown in FIGURE 5 is the finished cored laminate after removal from the mold 1, comprising first lamina 3, core material resulting from hardening or curing of mixture 4, and second or covering lamina 10, as produced by the method of this invention.

What I claim is:

1. The method for preparing a low density sandwich type cored laminate having a core density in the range twenty-five to forty pounds per cubic foot, comprising the steps of preparing a preformed first lamina in contact with the contours of a previously prepared mold surface, applying a mixture comprising a hardenable resin with cellular microparticulate aggregate dispersed therein in the form of a thin layer at least several times the thickness of a single cellular particle upon the surface of said lamina, applying additional dry cellular microparticulate aggregate of substantially the same size range to the surface of said mixture, allowing said dry aggregate to consolidate with said mixture, thereby producing a homogeneous core layer of substantially uniform density throughout its thickness, and applying a covering lamina in contact with the surface of said homogeneous core layer.

2. The method according to claim 1 including the steps of applying more than one thin layer of said mixture, applying dry cellular microparticulate aggregate to the surface of each such layer of mixture and allowing it to consolidate therewith, and allowing each layer to harden to at least a semi-cured state before applying the next thin layer of said mixture, thereby producing a plurality of homogeneous core layers, each layer having a substantially uniform density throughout its thickness.

3. The method according to claim 1 including the step of impacting said dry, cellular, aggregate against the surface of said mixture, thereby expediting the consolidation of said dry aggregate with said mixture.

4. The method according to claim 1 including the steps of depositing more than one homogeneous core layer separated from each succeeding homogeneous core layer by a lamina interposed therebetween, thereby building up a multiple core laminate of substantial thickness.

5. The method according to claim 1 in which said resin has a density of about seventy-two pounds per cubic foot before said microparticulate is dispersed therein and said mixture has a density of about fifty-five pounds per cubic foot before said additional dry aggregate is applied to the surface thereof.

6. The method according to claim 1 in which the average particle diameter of said cellular microparticulate aggregate is less than five hundred microns.

7. The method according to claim 1 in which the average particulate diameter of said cellular microparticulate aggregate lies in the range five to twenty microns.

8. The method according to claim 1 in which said resin is of the polyester type and said cellular microparticulate aggregate comprises phenolic micro-balloons.

References Cited by the Examiner

UNITED STATES PATENTS

| | | | |
|---|---|---|---|
| 2,765,248 | 10/1956 | Beech et al. | 156—245 X |
| 2,806,509 | 9/1957 | Bozzacco et al. | 161—161 |
| 2,821,890 | 2/1958 | Wilson | 94—44 |
| 3,079,289 | 2/1963 | George et al. | 252—63.5 |
| 3,103,406 | 9/1963 | Milewski et al. | 264—41 X |
| 3,168,411 | 2/1965 | Walsh | 117—26 |

EARL M. BERGERT, *Primary Examiner.*

V. A. MALLARE, T. R. SAVOIE, *Assistant Examiners.*